United States Patent
Ferrand et al.

(10) Patent No.: US 9,096,006 B2
(45) Date of Patent: Aug. 4, 2015

(54) SELF-LOCKING MOLD INCLUDING A FORCE-LIMITING MEANS

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Jean-Charles Ferrand, Clermont-Ferrand Cedex 9 (FR); Jean-Claude Aperce, Clermont-Ferrand (FR); Adrien Mondolo, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/361,661

(22) PCT Filed: Nov. 28, 2012

(86) PCT No.: PCT/EP2012/073856
§ 371 (c)(1),
(2) Date: May 29, 2014

(87) PCT Pub. No.: WO2013/079543
PCT Pub. Date: Jun. 6, 2013

(65) Prior Publication Data
US 2014/0356469 A1 Dec. 4, 2014

(30) Foreign Application Priority Data
Nov. 30, 2011 (FR) .................................. 11 60965

(51) Int. Cl.
*B29C 33/20* (2006.01)
*B29C 43/20* (2006.01)
*B29D 30/06* (2006.01)

(52) U.S. Cl.
CPC .......... *B29C 43/203* (2013.01); *B29D 30/0606* (2013.01); *B29D 30/0629* (2013.01); *B29D 2030/0607* (2013.01)

(58) Field of Classification Search
CPC .................. B29D 30/0606; B29D 30/0629
USPC ...................................... 425/46, 47
See application file for complete search history.

(56) References Cited

U.S. PATENT DOCUMENTS 5,180,592 A 1/1993 Laurent
5,304,270 A 4/1994 Siegenthaler
(Continued)

FOREIGN PATENT DOCUMENTS

EP 0436495 7/1991
EP 1918087 5/2008
FR 2087540 A5 12/1971

OTHER PUBLICATIONS

International Search Report for PCT/EP2012/073856 dated Feb. 28, 2013.

*Primary Examiner* — James Mackey
(74) *Attorney, Agent, or Firm* — Dickinson Wright PLLC

(57) ABSTRACT

Segmented mold for molding and vulcanizing a tire of given diameter, having shells and segments collaborating to withstand the internal pressure and remain in the closed position without assistance from additional components, having at its lateral edges a projection extending radially inwards, equipped with a lip extending axially towards the inside of the mold, having a frustoconical surface inclined at an angle α wherein extensions of the line of each frustoconical surface intersect on the radially internal side of the segment, each shell having a projection extending radially outwards and a lip having a frustoconical surface inclined by the same angle α, and containing force-limiting element having a stop and a housing positioned respectively in the radial extension of each of the projections and each having a bearing surface, to come into contact with one another when internal pressure in the mold exceeds a given threshold.

10 Claims, 4 Drawing Sheets

(56) References Cited

U.S. PATENT DOCUMENTS

| | | | |
|---|---|---|---|
| 5,492,464 A * | 2/1996 | Irie | 425/47 |
| 5,589,200 A * | 12/1996 | Irie | 425/47 |
| 7,354,261 B1 * | 4/2008 | Hineno et al. | 425/47 |
| 7,862,317 B2 * | 1/2011 | Menard et al. | 425/47 |
| 2008/0178990 A1 | 7/2008 | Menard et al. | |

* cited by examiner

SELF-LOCKING MOLD INCLUDING A FORCE-LIMITING MEANS

This application is a 371 national phase entry of PCT/EP2012/073856, filed 28 Nov. 2012, which claims benefit of FR 1160965, filed 30 Nov. 2011, the entire contents of which is incorporated by reference for all purposes.

BACKGROUND

1. Field

The disclosure relates to the field of the manufacture of tires and more particularly to the vulcanizing of very wide tires using molds referred to as self-locking molds.

2. Description of Related Art

Traditional molds are made up of several separate components which, when brought relatively closer together, delimit a substantially toroidal molding space. They essentially comprise two shells for molding the side walls of the tire, and several peripheral segments, situated between the shells, for molding the tread. All of these components are brought closer together by a mechanism external to the mold.

The green tire for vulcanizing is introduced into the mold and a curing membrane presses the tire firmly against the mold so as to imprint the tread pattern of the tread and obtain a vulcanized tire of precise dimensions. The pressure applied by the tire to the mold components is reacted by mechanisms which transfer the forces to the chassis of the curing press in order to keep the mold closed throughout the curing time.

More specifically, the invention is concerned with molds referred to as self-locking molds which have the special feature of comprising shells and segments which collaborate to withstand the pressure so that the components of the mold remain in the closed position without the aid of additional external wedging or retaining components.

Publication EP 0 436 495, or alternatively publication EP 1 918 087, describe a mold of this type in which each segment comprises at its lateral edges a projection extending radially towards the inside of the mold and equipped with a lip extending axially towards the inside of the mold. The radially outer end of each shell terminates in a complementary volume comprising a projection equipped with a lip. The said lips collaborate to keep the mold closed when this mold is subjected to an internal pressure that has a tendency to part the shells axially from one another and cause the sectors to retreat radially.

To this end, the mold comprises frustoconical bearing surfaces on the lips of the said segments and on the said shells. The said frustoconical surfaces are inclined by an angle $\alpha$ with respect to the axis of the mold, so that the extensions of the line of these frustoconical surfaces on a meridian plane intersect on the radially inner side of the segment concerned.

In order for the mold always to remain closed, the angle $\alpha$ is calculated so that the effect of the internal pressure on the shells which has a tendency to cause the segments to move closer towards the centre of the mold is dominant over the effect of the internal pressure on the segments that has a tendency to cause the segments to part radially and, by transmission of the radial forces via the frustoconical surfaces, to cause the shells to move closer together.

The angle $\alpha$ is more or less determined by the ratio of the surface area of the shells subjected to the internal pressure and the surface area of the segments subjected to the said pressure. It will be noted that this ratio corresponds to the ratio of the diameter of the mold at the interconnect point and the width of the mold at the top.

In this respect, the higher the internal pressure, the greater the forces holding the mold closed. This type of mold is therefore more commonly referred to as a self-locking mold.

SUMMARY

However, designing a mold of this type is not without its difficulties. Specifically, the forces involved are relatively high and the components are dimensioned in order to allow the smallest possible clearances, and so this may result in a mold the components of which are massive and, as a consequence, more expensive.

Thus, the wider the tread in relation to the side wall, the smaller the angle $\alpha$ needs to be, the consequence of this being a significant increase in the size of the projections intended to collaborate via the frustoconical surfaces.

It is an object of embodiments of the invention to propose a means that makes it possible to limit the forces applied to the projections in order to limit the sizing thereof.

The segmented mold according to embodiments of the invention is of the self-locking type comprising shells and segments collaborating to withstand the internal pressure and remain in the closed position without assistance from additional components, in which mold each segment comprises at its lateral edges a projection extending radially inwards, which projection is equipped with a lip extending axially towards the inside of the mold and having a frustoconical surface inclined at an angle $\alpha$ with respect to the axis of the mold such that the extensions of the line of each frustoconical surface on a meridian plane intersect on the radially internal side of the segment concerned, and in which mold each shell comprises a projection extending radially outwards and provided with a lip having a frustoconical surface inclined by the same angle $\alpha$ with respect to the axis XX' of the mold.

This mold is characterized in that it comprises force-limiting means made up of a stop and of a housing positioned respectively in the radial extension of each of the projections and each having a bearing surface, the said bearing surfaces being intended to come into contact with one another when the internal pressure in the mold exceeds a given threshold.

When the pressure increases, the forces exerted between the shell and the segments via the frustoconical surfaces have a tendency to cause the projection of the shell to penetrate the projection of the segments, increasing, as has already been seen, the clamping forces and the wedge effect exerted on the projections and connected with the frustoconical nature of the contacting surfaces.

When the bearing surfaces of the stops come into contact with the bearing surfaces of the housings, this wedge effect is limited and the transmission of force is spread between the bearing surfaces of the stops and the frustoconical surfaces. The force exerted on the projections is thereby correspondingly reduced, making it possible to reduce the thicknesses of material needed to contain the pressure-related forces.

According to a first alternative embodiment of the invention, the stop and the housing are positioned on the radially external side of the projections of the shell and of the segments so that the axially external bearing surface of the stop collaborates with the axially external bearing surface of the housing.

According to a second alternative embodiment of the invention, the stop and the housing are positioned on the radially internal side of the projections of the shell and of the segments so that the axially internal bearing surface of the stop collaborates with the axially internal bearing surface of the housing.

Advantageously, the axial clearance between the bearing surfaces of the stop and of the housing when the faces of each of the projections come into contact with one another may be comprised between 0.05 mm and 1 mm.

Alternatively, the axial clearance between the bearing surfaces of the stop and of the housing when the faces of each of the projections come into contact with one another can preferably be defined in such a way that the bearing surfaces of the stop and of the housing come into contact when the pressure in the mold represents between 50% and 80% of the nominal pressure.

The stop and the housing may extend over the entire circumference of the projections, or the stop may be formed of a plurality of circumference portions evenly distributed in a circle about the axis of the mold and extending radially from a projection.

Advantageously, the angle (a) of the frustoconical surface of the projections may be comprised between 10° and 40° and preferably between 15 and 35°.

With the mold having a width (L) and a diameter (J) at the interconnect point (E), and considering, in projection onto a meridian plane passing through the axis (XX') of the mold, the distance (a) comprised between a straight line parallel to the axis of the mold and passing through the point of application of the resultant of the forces of contact between the shells and the segments, and a straight line parallel to the axis of the mold and situated in the extension of the internal face of the resistant segment, it may advantageously be possible, in order to reduce the radial thickness of the resistant segments, to define the value of a such that it is equal to $$k*0.42*D_s\left(\frac{L}{J}\right)^2,$$

with a coefficient k comprised between 0.8 and 1.4.

BRIEF DESCRIPTION OF DRAWINGS

The description which follows is supported by FIGS. 1 to 4 in which.

DETAILED DESCRIPTION OF SPECIFIC EMBODIMENTS

Figure 1:
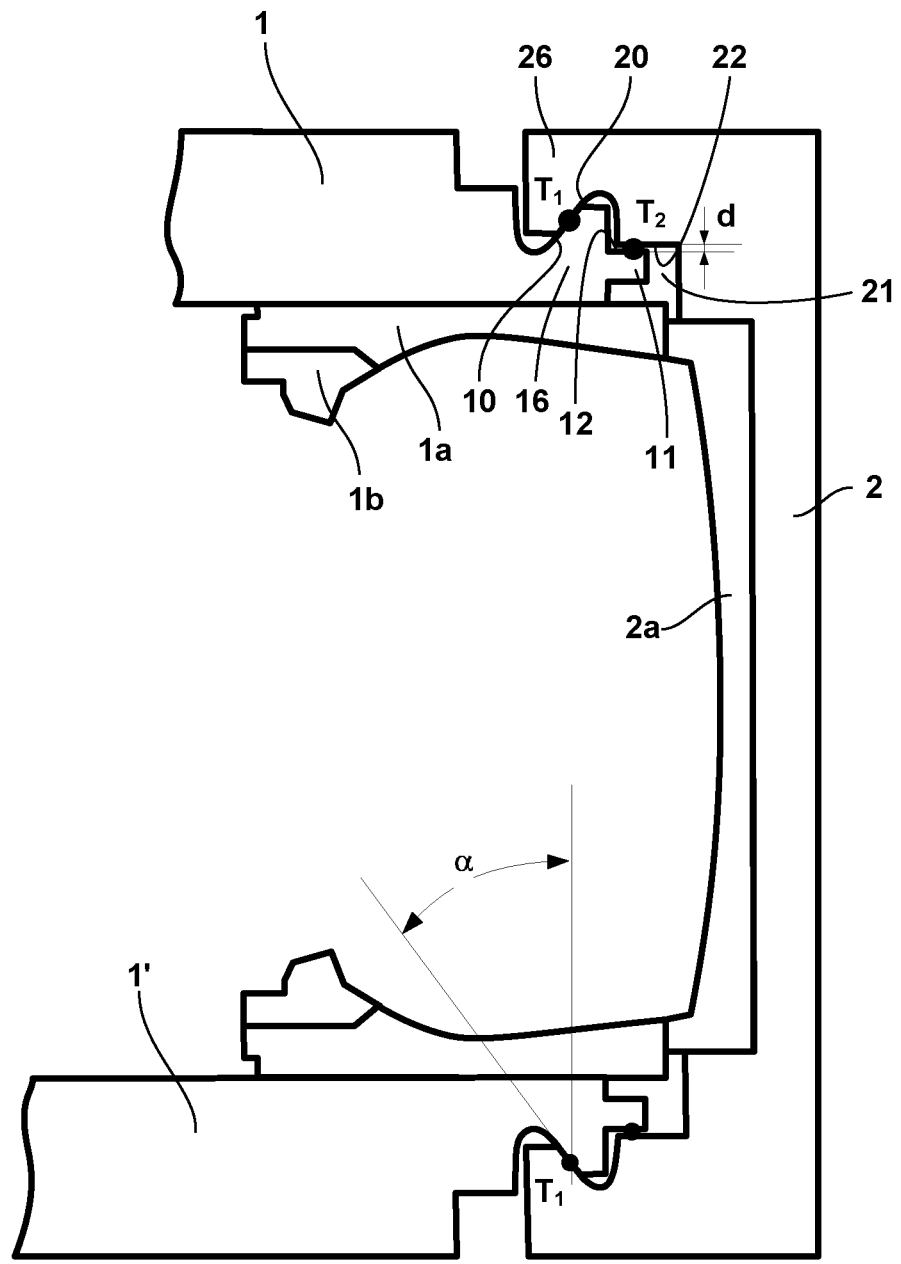
FIG. 1 is a half view in radial section of a mold according to the invention according to a first embodiment alternative.

FIG. 1 depicts a half view in radial section of a mold according to the invention. The mold comprises an upper shell 1 and a lower shell 1' both of circular shape. Resistant segments 2 are circumferentially distributed around the shells 1 and 1'.

The shells and the segments are associated with opening and closing means (not depicted) which are able to move the shells in the axial direction and to move the segments in the radial direction. The mold of FIG. 1 is therefore depicted in the closed position corresponding to the position in which the internal pressure forces act on the shells and the segments.

Figure 2:
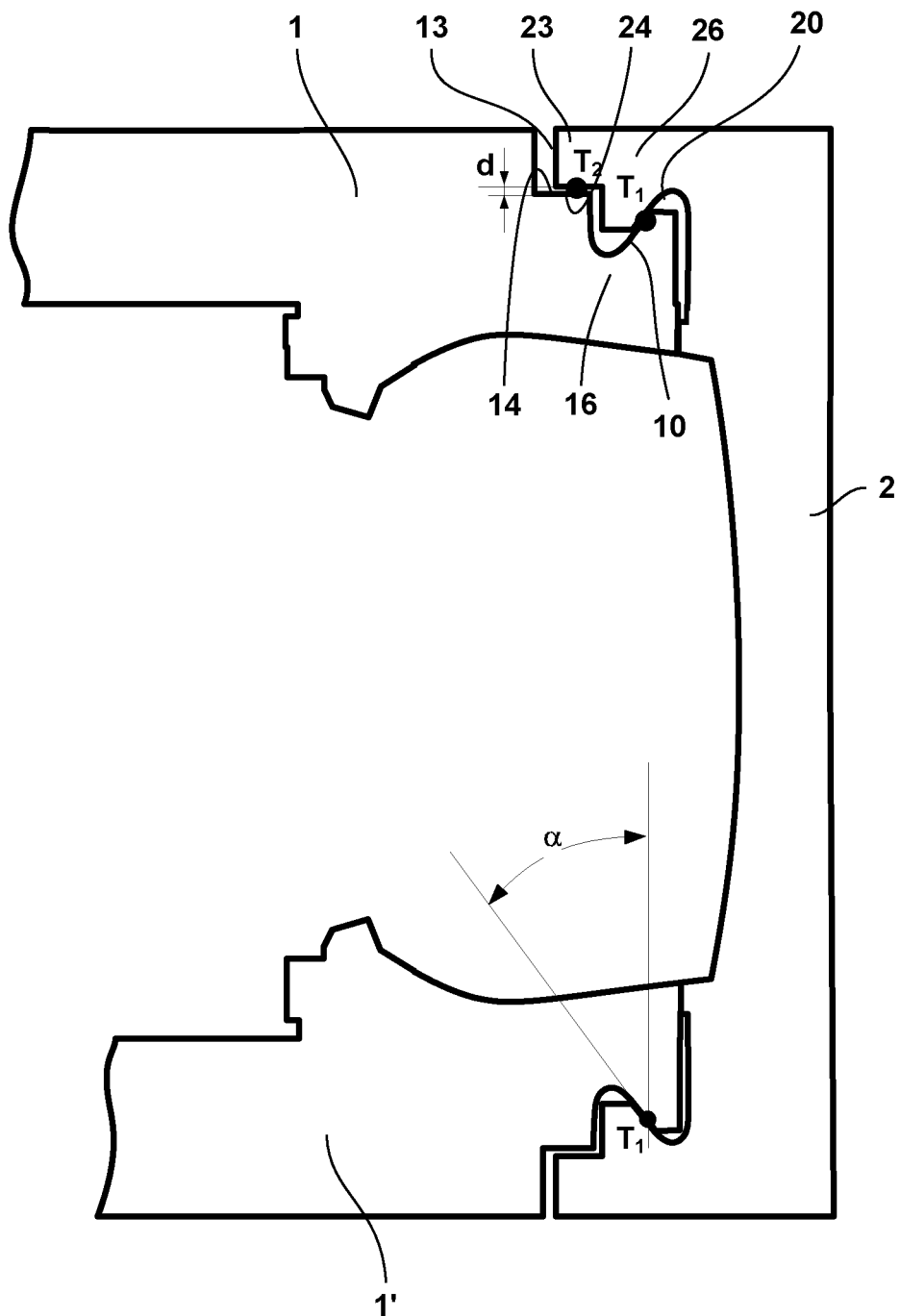
FIG. 2 is a half view in radial section of a mold according to the invention according to a second embodiment alternative.

As illustrated in FIG. 1, the shells may be formed of a resistant part 1 supporting non-resistant components 1a and 1b of which the internal part is intended to come into contact with the tire in order to mold the side wall zone (1a) or bottom part (1b). The expression non-resistant here means components that contribute little if anything to the mechanical strength of the mold under the effect of the pressure forces. It therefore goes without saying that the molding parts 1a and 1b can be produced as one with the shell 1, as illustrated in FIG. 2, or separately, as illustrated in FIG. 1, in order to allow a certain dimensional adaptation of the mold.

In the same way, the segments comprise a resistant part 2, and a tread pattern element 2a which is intended to mold the tread of the tire. The component 2a may also be formed as one with the resistant part 2, as illustrated in FIG. 2, and thus form a single resistant component.

Each segment comprises at its upper and lower lateral edge a projection 26 extending radially towards the inside and equipped with a lip likewise extending axially towards the inside of the mold and having a frustoconical surface 20 on a meridian plane passing through the axis XX'. The frustoconical surface 20 makes an angle α with the axial direction of the mold. The extensions of the line of each frustoconical surface in the meridian plane intersect on the radially internal side of the mold. In the closed position, as illustrated in FIG. 1, the extension of the frustoconical surfaces forms a cone the vertex of which is borne by the axis XX'.

Each shell 1 comprises a projection 16 extending radially outwards and equipped with a lip having a frustoconical surface 10 inclined by the same angle α with respect to the axis XX' of the mold.

In the closed position, the frustoconical surfaces 20 and 10 are positioned facing one another in contact with one another so as to react the closure forces generated by the pressure exerted on the shells and the segments.

The angle α is determined so that the forces exerted by the shells on the conical surfaces have a tendency to close the mold, opposing the forces exerted by the segments. To a first approximation, it is contrived for Tgα to remain smaller than the ratio $$\frac{J}{2L}.$$

The values of the angle α are, as a general rule, comprised between 10° and 40°, and preferably between 15° and 35°.

It will be noted here that too small an angle leads to an increase in the wedging effects and therefore in the thickness of the projections and means that the clearances between the segments and the shells cannot be compensated, and so in practice an angle α slightly smaller than the imposed limit hereinabove will be defined.

According to a first embodiment alternative of the invention, illustrated in FIG. 1, the shell 1 comprises a stop 11 situated in the radially external extension of the projection 16. This stop collaborates with a housing 21 situated radially on the outside of the projection 26 of the segments. The axially external surface of the stop 11 defines a bearing surface 12 intended to come into contact with the bearing surface 22 defined by the radially external surface of the housing 21 when the pressure increases and the projection of the shell penetrates the projection of the segments.

The second embodiment alternative of the invention, which is equivalent to the first one and illustrated in FIG. 2, consists in arranging the stop 23 in the radially internal extension of the projections 26 of the segments 2. The housing 13 is situated on the shell 1 radially on the inside in relation to the projection 16. The axially internal surface of the stop 23 defines a bearing surface 24 intended to come into contact with the bearing surface 14 defined by the radially internal surface of the housing 13.

The clearance between the bearing surfaces 12 and 22 or between the bearing surfaces 14 and 24 is defined by the distance d between the bearing surfaces at the moment the frustoconical surfaces come into contact upon closure. This clearance may beneficially be comprised between 0.05 mm and 1 mm depending on the size of the mold.

It is also possible to calculate the clearance so that the bearing surfaces of the stop and of the housing come into contact when the pressure in the mold reaches a predetermined value of the nominal pressure. For preference, this value may preferably represent 50% to 80% of the value of the pressure.

The stop or the housing as a general rule extend over the entire circumference of the shell and of the segments. However, it is possible to conceive of stops extending over portions of circumference and collaborating with housings extending over the entire circumference or over portions of the circumference of the shell or of the segments and situated facing stops with which they are intended to come into contact.

A refinement of the invention is to adjust the geometry of the segments in order to make use of the couples generated by the clamping forces exerted between the frustoconical surfaces and between the bearing surfaces of the stops and of the housings.

Figure 4:
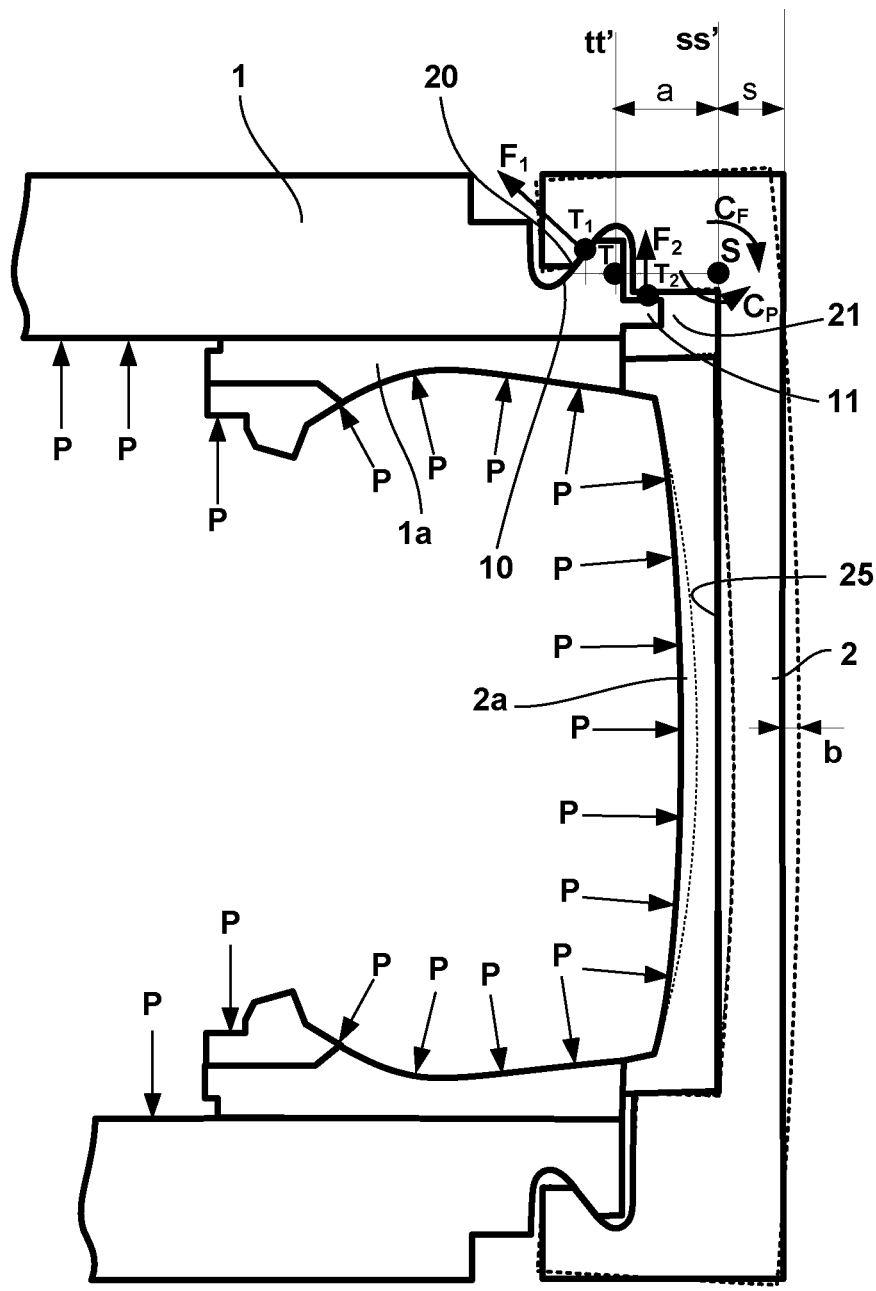

With reference to FIG. 4, it may indeed be seen that the pressure forces generate a bulge b oriented radially towards the outside of the mold. This deformation has the effect of increasing the circumference of the mold in the equatorial plane and therefore of causing clearances to appear between the segments. Knowing the permitted clearance tolerance that prevents rubber flash from appearing, it is then easy to determine the thickness s of the resistant segment in order to limit the deflection b to an admissible value. However, hasty calculation may lead to extremely high thicknesses s.

Figure 3:
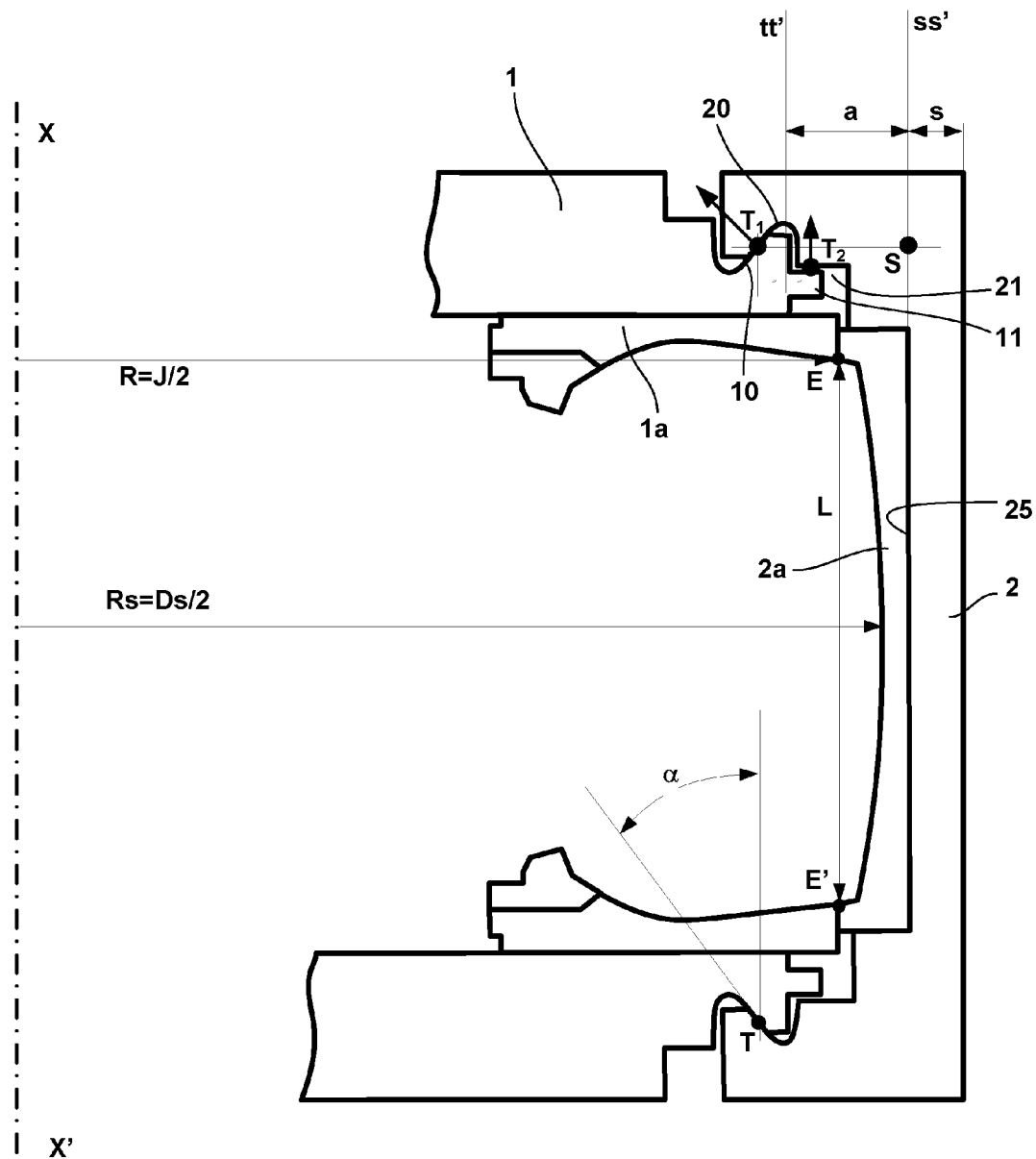
FIGS. 3 and 4 illustrate an improved way of embodying a mold according to the invention in each of the two alternatives.

With reference to FIG. 3, the interconnect point E is defined as the point of contact, at the molding part, between the shell 1 and the segments 2. This interconnect point defines the boundary between the zone at which the pressure forces acting on the shell are exerted and the zone at which the pressure forces acting on the segments are exerted.

The axial distance between the upper and lower interconnect points is denoted L. The radius at the interconnect point $R_E$ corresponds to half the diameter J. The radius $R_S$ corresponds to half the diameter of the mold $D_S$ at the equator.

The closure forces are applied at the point $T_1$ ($F_1$) situated between the two frustoconical surfaces 10 and 20, and at the point of contact $T_2$ ($F_2$) between the bearing surfaces of the stops and of the housings 12 and 22 or 14 and 24 respectively. The point T, defined as the point of application of the resultant of the forces F exerted between the shell and the segments, is situated between the points $T_1$ and $T_2$.

The straight line tt' passing through the point T and parallel to the axis XX' is plotted in the meridian plane passing through the axis XX'. This straight line is more or less the right bisector of the straight lines parallel to the axis XX' passing through $T_1$ and $T_2$. It will be noted here that the same reasoning applies to both embodiment alternatives of the invention.

A straight line ss' which extends the line of the intersection of the radially internal part 25 of the resistant segment 2 with the said meridian plane is plotted in the said meridian plane.

When the molding part 2a coincides with the resistant segment 2, the straight line ss' can then be likened to the straight line parallel to the axis XX' and tangential to the top of the mold, and more or less corresponds to the straight line passing through the point of intersection of the mold with an equatorial plane and parallel to the axis XX'. The intersection of the straight line ss' with a straight line perpendicular to the axis XX' and passing through the point T occurs at the point S.

The distance a corresponds to the (radial) distance between the straight lines tt' and ss'.

With reference to FIG. 3, the couple $C_F$ exerted by the resultant F of the closure forces at the point T with the lever arm a, and the couple $C_P$ corresponding to the couple exerted by the pressure forces on the resistant segment 2 are then determined at the point S.

It may be seen that these two couples oppose one another and are directly proportional to the pressure P and to the geometric characteristics of the mold, which are represented by the values of $D_S$, J, and L. The couples $C_P$ and $C_F$ are independent of the value of the angle α.

In order for these two couples to balance one another approximately, i.e. in order for the bulge b on the back of the segments to be substantially equal to zero, a value of a is determined such that $$a = 0.42 * D_s \left(\frac{L}{J}\right)^2.$$

It is then possible to opt for a first approach which consists, for a thickness value s of the resistant segments, in reducing the value of the lever arm a with respect to the value at equilibrium in order to obtain a bulge b the value of which gives a circumferential separation of the segments that is equal to the maximum tolerance corresponding to flash appearing between the segments. In that case, a value of a corresponding to 0.9 times or even to 0.8 times the value of a at equilibrium will be adopted.

Another approach is, on the other hand, to increase the value of a by comparison with the value at equilibrium, so as to obtain a "negative" bulge, i.e. a bulge oriented radially towards the inside of the mold, this amounting in fact to increasing the circumferential bracing of the segments against one another in order to compensate for the absence of an external bracing hoop positioned on the back of the segments. In that case, a value of a greater than the value of a at equilibrium, namely 1.3 or even 1.4 times this value, will be chosen.

The combination of the invention with the refinement described hereinabove makes it possible to optimize the quantities of material needed to keep the mold within the limits of deformation imposed by the rules governing the manufacture of tires and provides a very considerable competitive advantage.

The invention claimed is:

1. A segmented mold for molding and vulcanizing a tire of given diameter ($D_S$), comprising shells and segments collaborating to withstand internal pressure during molding and to remain in a closed position without assistance from additional components, wherein each segment comprises its lateral edges at which
a projection extends radially inwards, which projection is equipped with a lip extending axially towards an inside of the mold and having a frustoconical surface inclined at an angle α with respect to an axis (XX') of the mold such that extensions of the line of each frustoconical surface on a meridian plane intersect on a radially internal side of a respective segment, and wherein each shell comprises a projection extending radially outwards and provided with a lip having a frustoconical surface inclined by the same angle α with respect to the axis XX' of the mold, wherein the mold further comprises force-limiting means made up of a stop and of a housing positioned respectively in the radial extension of each of the projections and each having a bearing surface, the bearing surfaces adapted to come into contact with one another when the internal pressure in the mold exceeds a given threshold.

2. The mold according to claim 1, wherein the stop and the housing are positioned on a radially external side of the projections of the shell and of the segments so that an axially external bearing surface of the stop collaborates with an axially external bearing surface of the housing.

3. The mold according to claim 1, wherein the stop and the housing are positioned on a radially internal side of the projections of the shell and of the segments so that an axially internal bearing surface of the stop collaborates with an axially internal bearing surface of the housing.

4. The mold according to claim 1, wherein an axial clearance between the bearing surfaces of the stop and of the housing when the frustoconical surfaces of each of the projections come into contact with one another is between 0.05 mm and 1 mm.

5. The mold according to claim 1, wherein an axial clearance between the bearing surfaces of the stop and of the housing when the frustoconical surfaces of each of the projections come into contact with one another is tailored so that the bearing surfaces of the stop and of the housing come into contact when pressure in the mold represents a value of between 50% and 80% of nominal pressure in the mold.

6. The mold according to claim 1, wherein the stop and the housing extend over an entire circumference of the projections.

7. The mold according to claim 1, wherein the stop is formed of a plurality of portions extending over portions of a circumference of the shell and evenly distributed in a circle about an axis of the mold.

8. The mold according to claim 1, wherein the angle (α) of the frustoconical surface of the projections with respect to the axis (XX') is between b 10° and 40°.

9. The mold according to claim 1, having a diameter at a vertex ($D_S$), and a width (L) and a diameter (J) at an interconnect point (E), and wherein, in projection onto a meridian plane passing through the axis (XX') of the mold, a distance (a) comprised between a straight line (tt') parallel to the axis of the mold (XX') and passing through a point (T) of application of the resultant of the forces of contact between the shells and the segments, and a straight line (ss') parallel to the axis of the mold (XX') and situated in an extension of an internal face of a resistant segment is equal to $$k*0.42*D_S\left(\frac{L}{J}\right)^2,$$

with a coefficient k between 0.8 and 1.4.

10. The mold according to claim 8, wherein the angle (α) of the frustoconical surface of the projections with respect to the axis (XX') is between 15° and 35°.

* * * * *